Jan. 22, 1963 R. SOYER 3,074,232
DEVICES FORMING THE MOUTHPIECES OF AIR ADMISSION
PIPES FOR JET ENGINES FOR AIRCRAFT
Filed July 20, 1960 4 Sheets-Sheet 2

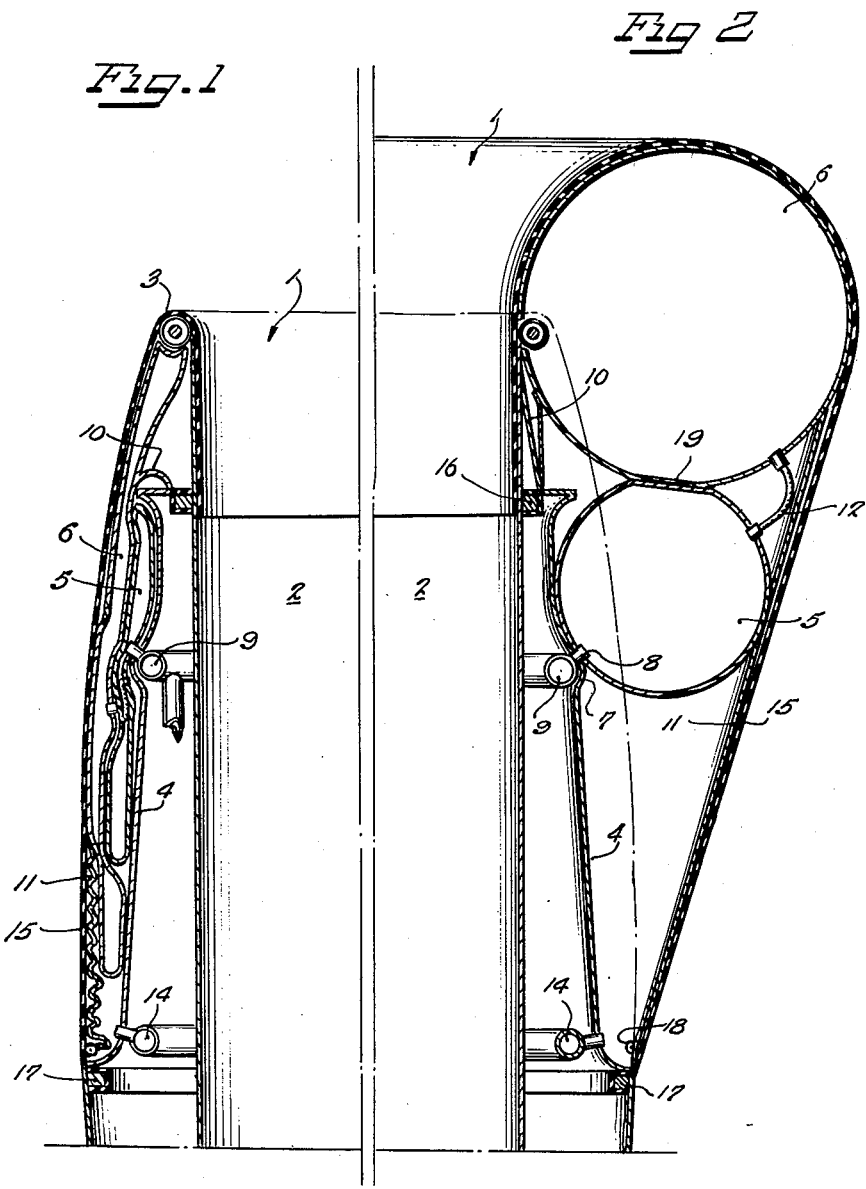

*Inventor*
ROBERT SOYER
By
Soans, Anderson, Luedeka & Fitch
*Attys*

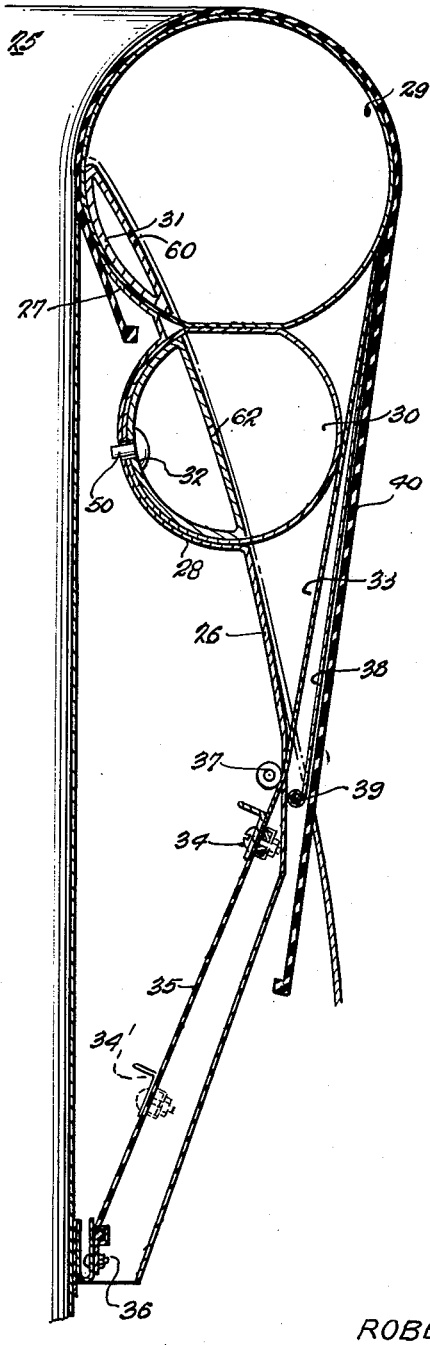

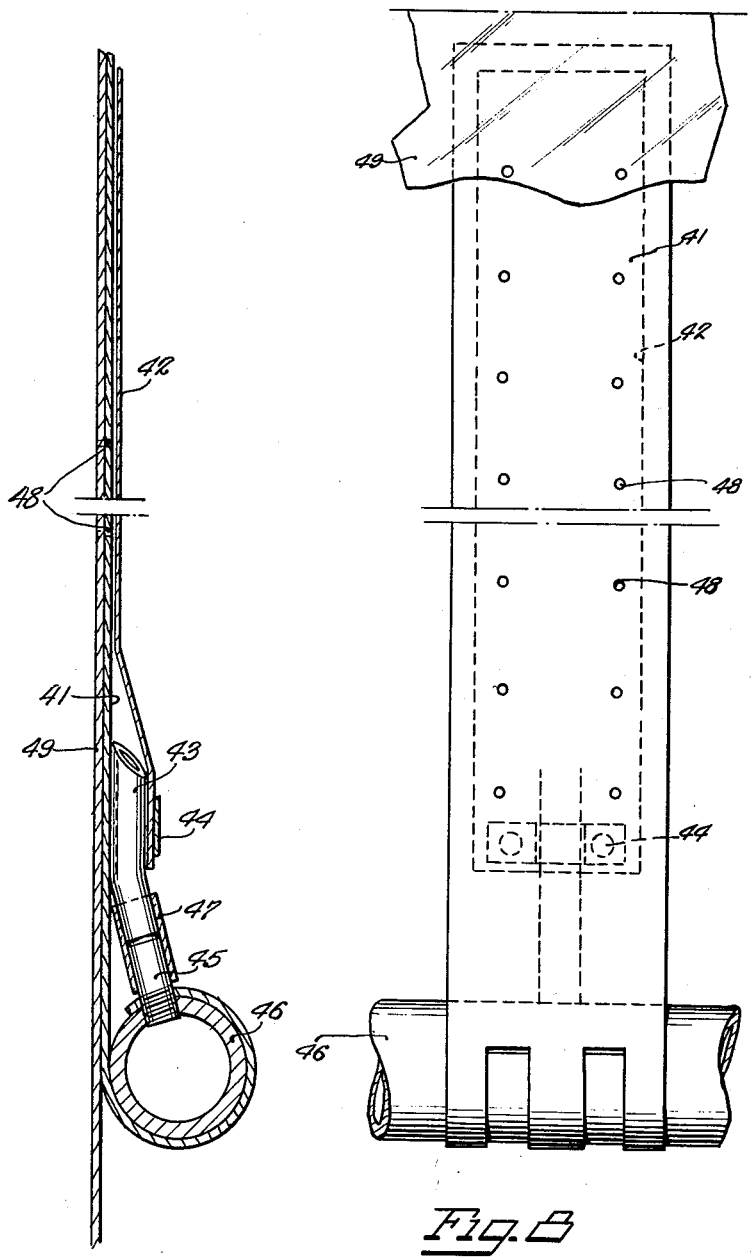

United States Patent Office 3,074,232
Patented Jan. 22, 1963

3,074,232
DEVICES FORMING THE MOUTHPIECES OF AIR ADMISSION PIPES FOR JET ENGINES FOR AIRCRAFT
Robert Soyer, 9 rue des Capucins, Bellevue, France
Filed July 20, 1960, Ser. No. 44,090
Claims priority, application France July 25, 1959
5 Claims. (Cl. 60—35.6)

The present invention relates to a device forming a mouthpiece for an air admission pipe for jet engines on board an aircraft.

It is known that the leading edges of air admission pipes for jet engines travelling at a very high speed should be formed with a sharp angle, in order to reduce drag.

This form of admission pipe, however, possesses considerable disadvantages upon taking off. It is well-known to those skilled in the art that the ideal form of mouthpiece for air admission pipes, when stationary and when taking off, is that of a large horn, the radius of curvature of which is considerable. This radius of curvature would be prohibitive in flight, even at low speeds.

It is the object of the present invention to overcome this drawback by the provision of a mouthpiece equipped with a transformable device.

According to the invention, the transformable device comprises an inflatable element which is secured near the free end of the air pipe to the outside of the latter and occupies in its non-inflated condition a reduced volume producing the tapered form of mouthpiece suitable for high speeds, and in its inflated condition, a form having a large radius of curvature at the front, as suitable for vertical taking off.

The features and advantages of my invention will appear from the following description given by way of example, with reference to the accompanying drawings in which:

FIG. 1 is an axial cross-section of the left-hand portion of a deformable device associated with the mouthpiece of the air admission pipe of an aerodyne jet engine, this deformable device being shown in its retracted condition.

FIG. 2 is an axial cross-section of the right-hand portion of said deformable device, this deformable device being shown in its expanded condition.

FIG. 6 is a view similar to FIG. 2 of a modified embodiment of my improved deformable arrangement.

FIG. 7 is a partial cross-section of a further modification of the outer wall of the transformable arrangement.

FIG. 8 is a partial view from above of the outer wall of the arrangement according to FIG. 7.

Figure 3:
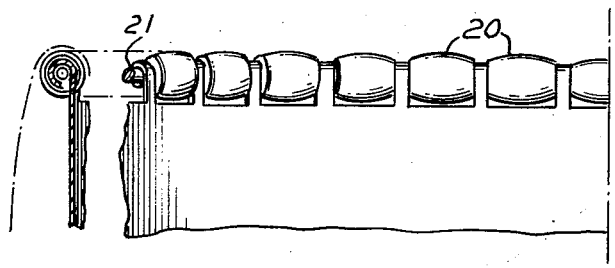
FIG. 3 is a view on an enlarged scale of the edge of the mouthpiece of the air admission pipe, it being assumed that the deformable device is not in its operative condition.

In the embodiment selected and illustrated in FIGS. 1 and 2, the mouthpiece 1 of the air admission pipe 2 adapted to feed a jet engine not shown, comprises a leading portion 3 of tapered form (FIG. 1) intended for aerodynes adapted to fly at high speeds, for example at sonic or supersonic speeds. The deformable device in its retracted position occupies an annular compartment 4 provided outside the front portion of the air admission passage 2.

This deformable device comprises essentially two inflatable elements 5 and 6 made of fluidproof inextensible fabric, each having a substantially toroidal form in its inflated condition (FIG. 2). These inflatable elements 5 and 6 are secured by different means. The element 5 which is the one more remote from the mouthpiece 1 bears against the terminal peripheral bearing 7 on the wall defining the compartment 4 and it comprises one or more annular series of anchoring points, each constituted by a rigid nipple 8 on a header 9. The inflatable element 6 which is nearer the mouthpiece 1 and is the larger of the two is held by means of two braces, one of which, 10, is secured to the outer surface of the outer wall of the air pipe 2, while the other brace, 11, is secured, on the one hand, to the outer surface of the inflatable element 6 and at 18 to the outer wall of the air pipe 2, on the other hand.

In addition to the nipples 8 engaging the inflatable element 5, there are provided small flexible tubes 12 providing connection between the two inflatable elements 5 and 6 and the inflatable element 5 engages a flexible pipe 13 connected with a stationary header 14. The deformable device as a whole is enclosed within an elastic envelope 15 in the form of an annular band secured to an annular element 16 of the inner wall of the air admission pipe 2 along its inner peripheral edge and to an annular element 17 of the outer wall of the air admission pipe 2 along its outer peripheral edge or bottom portion.

The elastic envelope 15 in its retracted position shown in FIG. 1 is prestressed in all directions, so that even at high speeds, all risks of deformation of the outer wall of the air admission pipe are avoided.

The operation of the device is as follows: the header 9 communicates by means of a two-way cock, controlled from the pilot's seat, with a source of air under pressure, for example a connection linking up with the high pressure side of the turbines of the jet engine. This allows changing over from the retracted condition according to FIG. 1 to the expanded condition according to FIG. 2, as provided upon opening of the cock admitting air under pressure to the header 9. At first, the element 5 and then the element 6 will be inflated until they assume the position illustrated in FIG. 2, in which the mouthpiece 1 of the air intake pipe 2 has a large radius of curvature suitable for taking off at low speeds, for a zero speed and for the event of a vertical take off. It will be noted that the whole is closely held under a considerable static load between the beading 7 on the wall of the compartment 4 and the braces 10 and 11. The flat portion 19 between the elements 5 and 6 defines the pressure or force of expansion required for stretching resiliently the envelope 15. The bearing surface for this purpose is situated against the beaded portion 7.

The change over from the expanded position (FIG. 2) to the retracted position (FIG. 1) is effected by operation of the cock setting the pipe or header 9 in communication with the outer air. Under the collapsing action of the elastic envelope 15, the assembly comprising the elements 5 and 6, the braces and the flexible pipes is returned towards the wall of the compartment 4, the casing or envelope 15 reaching then a position flush with the outer wall of the pipe 2. To improve the application of the envelope 15 against the outer wall of the jet engine, the pipe 14 may be made to communicate with the reduced pressure at the output of the turbines of the engine.

During the course of the above-described deformations, the elastic envelope 15 slides over the edge 3 of the mouthpiece 1 of the air pipe 2. To cut out any wear on the envelope 15 by friction, there are provided, as illustrated in FIG. 3, a series of rollers 20 mounted on a peripheral member 21.

Figure 4:
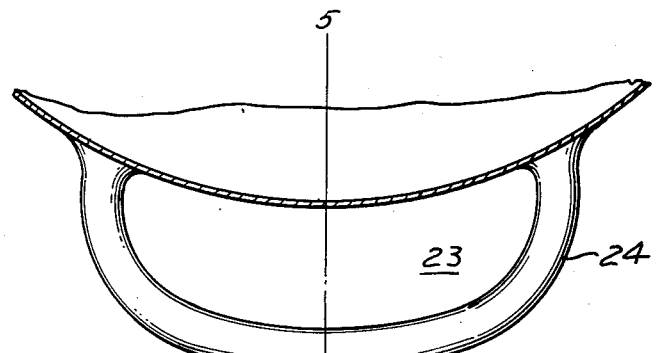
FIG. 4 is a front view of a ventral air admission pipe extending underneath the fuselage of the aerodyne or on both sides of the fuselage, the mouthpiece of this pipe being provided with my improved deformable device illustrated in its expanded condition.
Figure 5:
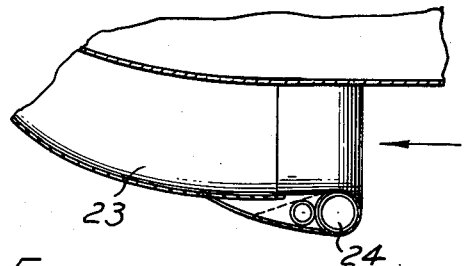
FIG. 5 is a diagrammatic sectional view taken along line V—V of FIG. 4.

It will be understood that the arrangement according to the invention may be adapted to all types of pipes for admitting air to jet engines. By way of example, there has been illustrated in FIGS. 4 and 5 a ventral admission pipe 23 furnished with transformable means 24 in their expanded condition ready for the take off. The deformable device here obviously covers only the free edge of the passage 23. When carrying the invention into effect, the arrangement according to said invention is subject to various structural modifications. The number of inflatable elements may be different and the means for connecting same may vary.

Thus, for example, instead of securing the front edge of the elastic envelope to the interior of the air admission pipe, it may as well be secured to the outer edge of said pipe.

According to the modification illustrated in FIG. 6, the deformable arrangement fitted on the intake opening 25 of a jet engine includes a carrier 26 forming the outer wall of the admission pipe and provided with two toreshaped recesses 27 and 28 forming bearing surfaces for the inflatable elements or cells 29 and 30 when inflated.

Inside said inflatable elements 29 and 30 are arranged two plates 31 and 32 respectively, the outer surfaces of which are alined with that of the carrier 26 outside the parts of the latter registering with the recesses 27 and 28. These plates 31 and 32 are each provided with nozzles 50 (shown only with respect to plate 32 in FIGURE 6) for admission of air pressure and making vacuum. Each of the plate structures 31 and 32 also have communication with the cells 29 and 30 through ports 60 and 62, respectively.

The inflatable elements 29 and 30 are secured to canvas shrouds 33 which are secured in their turn, through the joint 34, with an annular elastic strip 35 secured by anchoring means 36 along their peripheral edge to the admission pipe on the inside of the carrier 26. A roller 37 allows guiding the shroud 33 at the point where the latter extends through the carrier plate 26 towards the inside of the latter. In registry with the shroud 33 and on the outside of the carrier 26 are provided sheaths 38 constituted by thin metal plates pivotally secured to the hinges 39 at their edges adjacent the plate 26, while their other edges facing the inflatable elements are free.

An elastic casing 40 encloses with a preliminary tensioning the complete inflatable arrangement.

In their collapsed position, the inflatable elements 29 and 30 are urged rearwardly, so as to engage the flat continuous surface constituted by the plate 26 and the supports 31 and 32 under the action of the pressure exerted chiefly by the casing 40, while the joined edge of the shroud 33 enters, as shown at 34', further inside the plate 26 under the action of the elastic returning strip 35, which remains tensioned even for this collapsed condition of the arrangement.

The arrangement described allows obtaining in an uninflated condition a smooth and resistant outer surface by reason of the interposition of the sheaths 38 and casing 40, which allows incorporating said arrangement with aircrafts flying at considerable speeds, say, Mach 2 or even Mach 3.

In order to still further improve the behavior of the outer casing at very high speeds, it is also possible to resort to an arrangement of the type illustrated in FIGS. 7 and 8. In said case, the sheaths such as 38, made of yielding metal sheets, 41 say very thin duralumin, are associated with a fluidtight canvas 42 which is glued or welded to the periphery of each sheath 41, so as to form a chamber therewith.

In said chamber, there is provided an arrangement subjected to a reduced pressure and constituted by two tubular interconnected sections, of which one, 43, engages said chamber and is secured thereto by a strap 44, while the other section, 45, is screwed into a tube 46 adapted to communicate with a source of reduced pressure and serving also as a pivot for the sheaths 41, 42.

A sleeve 47 ensures the connection between the two tube sections 44 and 45. Each sheath 41 is provided with a number of bores 48, so that, when subjected to a reduced pressure at the end of the collapsing movement of the deformable arrangement, the outer member of the different sheath systems forms a suction wall for the casing 49 which is thus held permanently in contact with the sheaths. Said arrangement is of particular advantage, in the case of very high speeds, for flat surfaces or for surfaces the concavity of which is directed outwardly.

In all cases, it is of advantage to make the inflatable cells or elements and also the attachment means of synthetic fibres having a high mechanical resistance and capable of being readily crumpled. Each inflatable cell is advantageously made of non-extensible canvas which may be made fluidtight and/or associaed with an inner air chamber. The outer casing or cover is preferably made of a silicone.

What I claim is:

1. In a jet engine for an aerodyne travelling at high speeds, an air-admitting system comprising an admission pipe having a leading edge, said pipe including an outer wall provided with at least one recess along its periphery, said outer wall having transverse slots located rearwardly of said recesses, at least one inflatable element secured to said outer wall of the admission pipe along the outer periphery of the latter near its leading edge and adapted to occupy, when non-inflated, a reduced volume to make a thin, slightly tapering configuration at said leading edge and to assume, when inflated, a shape having a large radius of curvature along the leading edge of said admission pipe, the inflated elements bearing against corresponding recesses in the outer wall of the admission pipe, a plate inserted in each inflatable element and covering permanently the cooperating recess to provide continuity of the outer wall of the admission pipe, a canvas shroud secured outwardly on the inflatable elements and passing through the slots in the outer wall, a member provided inside said outer wall for tensioning permanently said shroud to urge it over the inflatable elements, slightly flexible sheaths fitted between the shroud and the outer wall of the admission pipe and surrounding the admission pipe adjacent its leading edge, said sheaths being pivotally secured to said outer wall near the slots in the latter, each sheath including an inner yielding airtight wall and an outer perforated wall, a prestressed cover of an elastic material surrounding the inflatable elements, the shroud and the sheaths, and means for reducing the pressure between the two walls of the sheaths to make the cover adhere through suction against said sheatths.

2. In a jet engine for a high velocity aircraft, an air admission system comprising an admission pipe having a leading edge, said pipe including a wall provided with at least one annular recess extending around its periphery in rearwardly adjacent relation to said leading edge, an inflatable element received within said recess, said element, when non-inflated, providing said leading edge with a thin, tapered configuration and assuming, when inflated, an enlarged generally toroidal shape so as to provide said leading edge with a rounded configuration having a large radius of curvature, means connected to said element for inflating said element, said element bearing, when inflated, against the annular recess within which it is received, and a plate within said inflatable element in position for permanently covering the recess within which said element is received, whereby the wall of said admission pipe is provided with an essentially continuous and smooth surface when said element is deflated.

3. In a jet engine for a high velocity aircraft, an air admission system comprising an admission pipe having a thin leading edge, at least two inflatable elements secured to the outer periphery of the latter and near its leading edge, the one of said inflatable elements closest to said leading edge being larger when inflated than the other of said elements when inflated, means defining an annular recess on the outer surface of said pipe in position to receive each of said inflatable elements, an annular, rigid element within each of said inflatable elements in engagement with one of said annular recesses so as to fixedly position said inflatable element along the outer surface of said admission pipe, means connected to said elements for inflating them, means connected to said pipe and enclosing said inflatable elements so as to yieldably urge said elements against said annular recesses on said pipe, whereby inflation of said elements will enlarge the otherwise thin leading edge of said admission pipe into a form having a large radius of curvature and a firm, progressively sloped wall leading away from that curvature and toward a rearward portion of said admission pipe.

4. In a jet engine for a high velocity aircraft, an air admission system comprising an admission pipe having a forward leading edge, at least one inflatable element secured to said pipe adjacent said leading edge, said element, when non-inflated, providing said leading edge with a thin, tapered configuration and assuming, when inflated, a shape having a large radius of curvature at the leading edge of the admission pipe, means for inflating said element, a cover of an elastic material surrounding the outer surface of the inflatable element and urging it toward the outer surface of the admission pipe, a plurality of generally rigid movable sheaths having a generally smooth outer surface, said sheaths being pivotally mounted around said pipe and disposed between said element and said cover for outward and inward movement responsive to inflation and deflation of said element, thereby providing a generally smooth outer surface for said pipe, each of said sheaths including an inner yielding wall and an outer perforated wall tightly secured together along their periphery, said walls forming a chamber therebetween said two walls of the sheath connected to a source of reduced pressure to cause said cover to adhere to said sheath.

5. In a jet engine for a high velocity aircraft, an air admitting system including an intake cowl having a leading edge variable in configuration from a sharp edge for high speeds to a round edge for taking off and for low speeds, said intake cowl including a generally cylindrical inner wall through which air is admitted, an outer wall extending rearwardly from said leading edge along said inner wall and progressively spaced from said inner wall, said outer wall having at least two annular recesses extending around its periphery adjacent to said leading edge, inflatable cells adjacent said outer wall and adapted, when inflated, to bear respectively in said recesses, the cell which is closest to said leading edge having a generally toroidal shape when inflated to provide a rounded configuration for the leading edge, means for inflating said cells, a plate within each of said inflatable cells in position for permanently covering the annular recess within which said element is received, an elastic cover for elasticly urging the cells against said outer wall, said elastic cover urging said cells, when inflated, against one another and against said recesses in said outer wall, engagement of the cell farthest from the leading edge with the recess within which it bears serving to restrain movement of said cells in a direction rearwardly away from said leading edge.

References Cited in the file of this patent

UNITED STATES PATENTS

| 2,343,986 | Leutholt | Mar. 14, 1944 |
| 2,378,528 | Arsandaux | June 19, 1945 |
| 2,504,684 | Harper | Apr. 18, 1950 |
| 2,763,426 | Erwin | Sept. 18, 1956 |
| 2,780,913 | Nicks | Feb. 12, 1957 |
| 2,934,288 | MacIntyre | Apr. 26, 1960 |
| 2,937,826 | Johnson | May 24, 1960 |

FOREIGN PATENTS

| 1,169,870 | France | Sept. 15, 1958 |